April 30, 1957  L. A. TROFIMOV  2,790,917
ELECTRIC TORQUE-CONVERTER TRANSMISSIONS
Filed Sept. 9, 1953  3 Sheets-Sheet 1

INVENTOR.
Lev A. Trofimov
BY Harry P. Canfield
ATTORNEY.

INVENTOR.
Lev A. Trofimov
BY Harry P. Canfield
ATTORNEY.

April 30, 1957   L. A. TROFIMOV   2,790,917
ELECTRIC TORQUE-CONVERTER TRANSMISSIONS
Filed Sept. 9, 1953   3 Sheets-Sheet 3

INVENTOR.
Lev A. Trofimov
BY Harry P. Canfield
ATTORNEY.

United States Patent Office 2,790,917
Patented Apr. 30, 1957

2,790,917

ELECTRIC TORQUE-CONVERTER TRANSMISSIONS

Lev A. Trofimov, Willoughby, Ohio, assignor to Fairchild Engine and Airplane Corporation, a corporation of Maryland Application September 9, 1953, Serial No. 379,275

2 Claims. (Cl. 310—102)

This application is a continuation-in-part of my copending application Serial Number 186,554, filed September 25, 1950, now Patent No. 2,654,849.

This invention relates to power transmissions of the class that transmit power from a rotary power source to a rotary driven load; and relates particularly to transmissions that respond automatically to apply the source power to the load at high torque when the load speed is low, and at lower torque when the load speed is high, and to brake the load when it is overhauling.

Such transmissions are applicable to many kinds of driven loads; but for the sake of a concrete disclosure to satisfy the requirements of a patent application, it will be described herein as applied to transmit power of an automotive vehicle engine to the vehicle driving axle.

Power, generally, may be represented by the product of rotary speed and torque; and the same power may be developed at high speed and low torque, or at low speed and high torque.

In the case of a vehicle, when it is at rest, and its driving axle is not rotating, or when it is rotating at low speed, for example when starting from rest and accelerating, or when the vehicle slows down on climbing a hill, it is desirable for the engine power to be delivered to the driving axle at high torque, corresponding to the low speed of the axle. At other times, vehicle speed is wanted and it is then desirable for the engine power to be delivered at high axle speed, and the correspondingly reduced torque is no disadvantage.

This conversion of power from low speed and high torque to high speed and low torque has long been effected, conventionally, by speed change gears in the transmission, shifted from one ratio to another manually; and in more recent developments shifted automatically.

Various proposals have been made for converting power in this manner, without speed change gears. One proposal comprises rotary elements, connected to the engine and to the driving axle; and transmitting power through an oil medium; the torque component of which varies with the relative movement between the elements.

The present invention is a radical departure from prior converters of this class in that it is electrical, or electrodynamic, and utilizes in general the principle of the squirrel cage induction electric motor, the efficiency and reliability of which have long been established.

As is known, in squirrel cage induction motor practice, a rotating, magnetic field is produced in a stator by alternating supply current; and a rotor is mounted to rotate within the rotating field. The rotor has conductors in which current is generated by the rotating field. The revolutions per minute of the rotating field are determined and fixed by the frequency of the alternating supply current and the number of poles of the stator. The torque developed in the rotor depends upon the speed of the rotor relative to that of the rotating field and upon the resistance of the rotor conductors.

The rotor conductors may be designed to have relatively high resistance and in such case the torque developed in the rotor will be at zero value when the rotor is rotating at the same speed as that of the rotating stator field, that is, is rotating at "synchronous" speed; and will increase as the rotor speed decreases, reaching a maximum value when the rotor is at rest, or at zero speed.

Or, the rotor may be designed to have relatively low conductor resistance in which case the rotor torque will again be of zero value at synchronous rotor speed, and will rise as the rotor speed decreases, reaching a maximum at some intermediate speed, and then falling off to a lower value at zero rotor speed.

The transmission of the present invention, in one form thereof comprises, generally speaking, a rotary field pole structure driven by the engine and having magnetic field poles of alternate polarity, which generates alternating current in conductors of an annular stator, thereby producing a rotating magnetic stator field. A rotor corresponding generally to the rotor of a squirrel cage induction motor, is mounted within the rotary field; and torque is developed in the rotor and applied to the vehicle axle.

The rotor is preferably designed to develop maximum torque at zero speed. The "synchronous" speed of the rotating magnetic field is obvious variable, determined by the engine speed; and as will be apparent, if the synchronous speed is increased, the said maximum torque at zero rotor speed will increase, and vice versa.

When the rotor and the vehicle axle connected to it are at rest, the power of the engine, represented by both speed and torque, is substantially all converted into torque at the rotor and applied to the axle; and the torque thus applied to start and accelerate the vehicle is engine torque greatly multiplied; and this multiplied torque may be again and further multiplied by increasing the engine speed to increase the said "synchronous" speed.

As the vehicle accelerates from rest, and at all times while being driven, the torque applied to the axle will be less than said maximum, because the speed of the rotor approaches the "synchronous" speed; but the torque will always rise at any slowing down of the vehicle as the rotor speed approaches zero speed.

The magnetic field poles driven by the engine are energized by direct current, and preferably may be cut off by an operator's switch, whereby the development of torque on the vehicle axle may be discontinued. Thus the need of a clutch in the line of transmission between engine and axle is eliminated.

In another form of the invention, a differential gearing is utilized by which the synchronous speed of the rotating magnetic field of the stator is made greater for an given engine speed, with the advantages explained hereinafter.

When the vehicle "overhauls" as when going downhill, the rotor is driven above the synchronous speed of the rotary field, and acts as the rotor of a generator and absorbs power and acts as a dynamic brake for the vehicle, and the effectiveness of the braking action may be varied by varying the speed of the engine to vary the synchronous speed.

While the invention has been described as applied to drive a vehicle by engine power, the invention is applicable to drive other kinds of loads by power from other sources; and is therefore not limited to engine driven vehicles.

The actual invention is that set forth in the appended claims.

The objects of the invention, as will be apparent from the foregoing, are:

To provide generally an improved power transmission of the torque-converter class;

To provide a torque-converter transmission in which torque conversion is effected electro-dynamically;

To provide a torque-converter transmission which will, in an improved manner, develop torque from the power of a rotary power source and apply it to a load in amount varying inversely with the speed of the load;

To provide a torque-converter transmission which, in an improved manner, will develop torque from the power of a rotary power source and apply it to a load in amount varying inversely with the speed of the load, and which when the load overhauls the transmission, will develop torque and apply it to the load to brake the load, in amount varying directly with the speed of the load;

To provide a transmission for utilization between a variable speed source of rotary power and a rotary load and which comprises a rotor connected to the load, and which provides a rotary magnetic field rotating at variable speed in accordance with the speed of power source, and develops torque in the rotor commensurate with the difference in speed of the load and the field to drive the load, or to brake the load when the load is at an overhauling speed.

Other objects will be apparent to those skilled in the art to which the invention appertains.

The invention is fully disclosed in the following description taken in connection with the accompanying drawing, in which.

Figure 1:
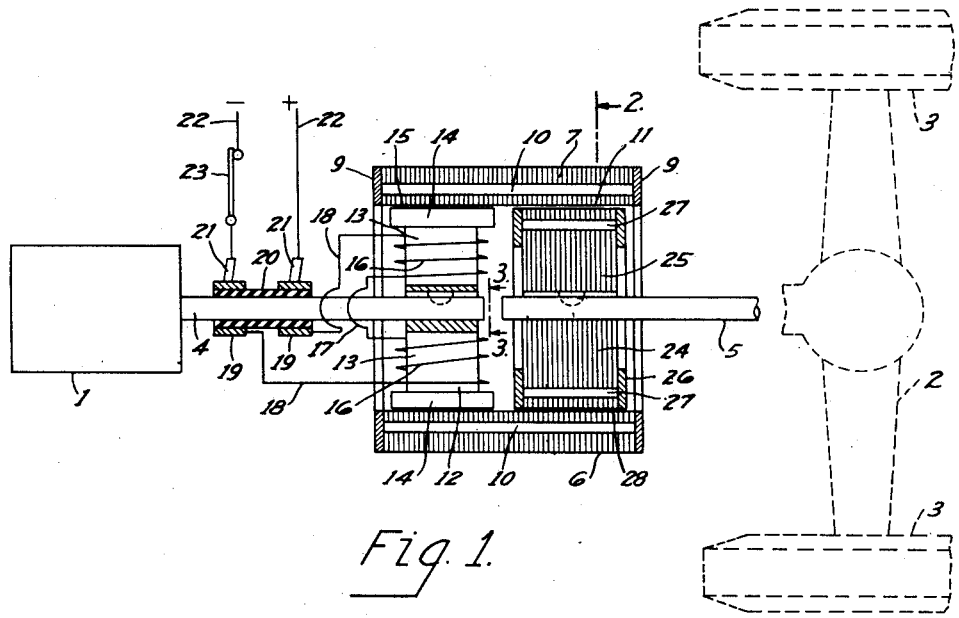
Fig. 1 is a diagrammatic view illustrating an embodiment of the invention in one form.
Figure 3:
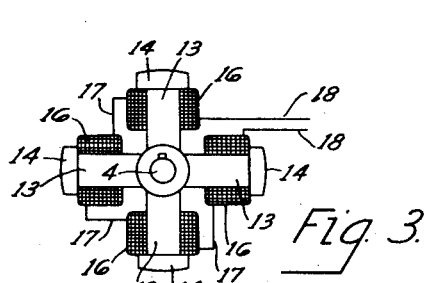
Fig. 3 is an end elevational view of a field pole element, with windings thereof in section, the view being taken from the plane 3—3 of Fig. 1.
Figure 2:
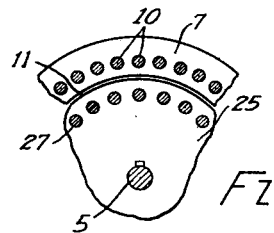
Fig. 2 is a fragmentary sectional view from the plane 2 of Fig. 1.

Referring to the drawing Figs. 1 to 3 inclusive, there is indicated at 1 a source of rotary power, for example the internal combustion engine for driving a vehicle, and including an engine speed control for example the usual accelerator pedal controlling fuel to the engine; and at 2 is indicated the housing of the driving axle construction of the vehicle, and having therein but not shown, the usual differential gearing drivingly connected to vehicle wheels 3—3.

At 4 is a power output shaft from the engine; at 5 is a power input shaft broken off but to be understood as connected to the rear axle construction in the housing 2.

Between the shafts 4 and 5 is a transmission unit designated generally as 6, now to be described.

At 7 is a tubular stator built up of annular electrical steel laminations 8—8 between annular end rings 9—9, the end rings being of electrically conducting metal and electrically connected together by a series of electrically conducting stator bars 10—10.

The construction will be recognized as generally similar to that employed for the rotors of squirrel cage induction motors and accordingly the stator laminations 8 are provided with aligned perforations for receiving the bars 10; and the ends of the bars may be riveted over to join them (mechanically and electrically) to the end rings 9—9, or the stator bars may be cast, in situ, integral with the end rings.

It is to be understood that the stator is stationary, being mounted in a frame not shown in the diagrammatic drawing. The stator when so mounted has a cylindrical inner surface 11 coaxial with the shafts 4 and 5.

Mounted and secured to the output shaft 4 to be driven by it, is a field pole structure 12 comprising a plurality of field poles 13 preferably terminating outwardly radially in pole pieces 14—14 conforming externally to the cylindrical surface 11 of the stator but spaced therefrom by a circumscribing air gap 15.

The field poles 13 are preferably of alternate polarity and have direct current energizing windings 16—16 thereon, connected in series as shown, by wires 17—17 (see Fig. 3) and energized by terminal wires 18 connected to collector rings 19—19 mounted on an insulating sleeve 20 on the shaft 4, and by brushes 21—21 on the rings connected by wires 22—22 to a source of direct current, through a disconnecting switch 23.

By this means unidirectional field flux may be produced in the field poles 13—13 and maintained during rotation of the shaft 4 or the flow of flux may be interrupted upon opening the switch 23.

Figure 4:
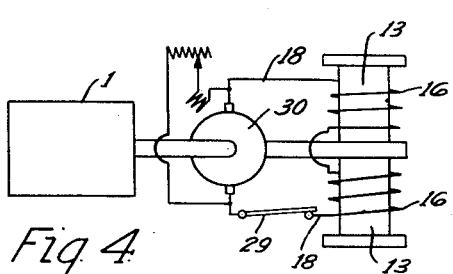
Fig. 4 is a view similar to a part of Fig. 1 illustrating a modification.

An alternative means to energize the field pole windings 16—16 is shown in Fig. 4. The terminal wires 18—18 go through a switch 29 to the brushes of a direct current generator 30 driven by the engine 1, and having a self-exciting field 31, the advantages of which will be described later.

Mounted on the input shaft 5 and secured thereto to rotate therewith is a rotor 24, having the general construction of the rotor of a squirrel cage induction motor; and accordingly, comprising electrical steel laminations 25 between conducting end rings 26, the end rings being connected by conducting bars 27 in aligned perforations in the laminations.

The rotor 24 is of substantial extent axially, and is within the tubular stator 7 and its periphery is cylindrical and spaced from the stator surface 11 by an air gap 28.

The unidirectional flux from the field poles 13 utilizes the circumscribing stator 7 as a flux return path from pole to pole; as the field poles rotate, their flux cuts the conductor bars 10 of the stator at portions thereof radially opposite the field poles 13, (that is in the left half of the stator as viewed) and generates currents in the bars, the end rings 9—9 completing the circuits for such currents.

These currents in the bars 10—10 at portions thereof radially opposite the rotor 24 (that is in the right half of the stator 7 as viewed) produce field flux flowing through the rotor 24, in correspondence with the flux in the field poles 13; and since the polarity of the latter rotates, the polarity of the stator produced field through the rotor 24 rotates, and at the same speed as the field poles 13.

The rotor 24 is thus acted upon by the rotating field of the stator 7 in the same way that the rotor of a squirrel cage induction motor is acted upon by the rotating field of its stator produced by stator windings energized by current from an alternating current source.

In the case of the induction motor, the stator field revolves at a velocity determined by the frequency of the alternating supply current and the number of "poles" in the stator winding, a two pole field energized at 60 cycles per second producing a field rotating at 3600 R. P. M. and a four pole winding energized at 60 cycles per second producing a field rotating at 1800 R. P. M. etc. The revolutions per minute of the stator field of such a motor is referred to as "synchronous" speed.

In the arrangement here presented, the synchronous speed of the rotating field of the stator varies with variations of the engine speed, which varies the speed of the field poles 13. If for example the engine shaft 4 were rotating 3600 R. P. M. and there were two field poles 13, the stator field would rotate at a "synchronous" speed of 3600 R. P. M. and the current developed in the stator bars would be at 60 cycles per second; and if there were four field poles 13 the synchronous speed would again be 3600 R. P. M. but the current in the stator bars would be at 120 cycles per second.

The conventional squirrel cage induction motor has a well known torque-speed curve, the characteristics of which vary with the ohmic resistance of its rotor conductors or conductor circuits.

Figure 5:
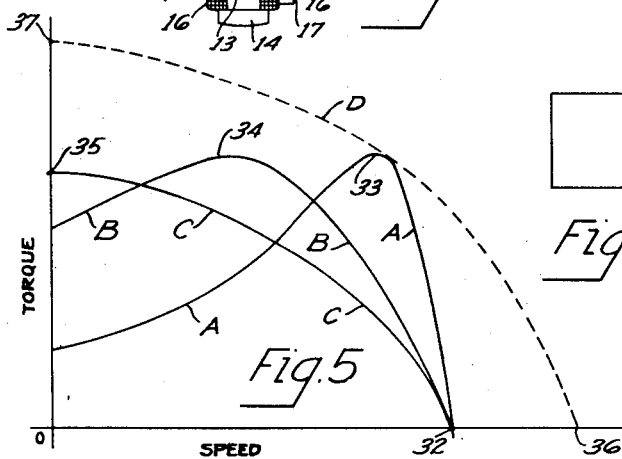
Fig. 5 is a torque-speed diagram illustrating certain operative characteristics of the embodiment of Fig. 1.

When its rotor conductors comprise copper bars connected to copper end rings of ample cross section and therefore of low resistance, the torque-speed curve takes on the characteristics shown in curve A, Fig. 5. The torque is zero at 32, which is at 100% synchronous speed of the rotor; rises rapidly to a maximum torque at 33; and then falls off as speed approaches zero.

When the rotor is given higher resistance, the torque peak moves toward the left and as at 34 may occur at one-half synchronous speed giving a torque curve B.

For a chosen predetermined high rotor resistance, the torque curve takes on the characteristics of curve C, Fig. 5, the maximum torque as at 35 being developed when the rotor is at rest, and the torque falling off to zero at full synchronous speed.

Commercial motors are known in which the maximum torque 35 at zero speed is two to three times the full load torque at which the motor can operate.

In designing the rotor 24 according to this invention, resistance is provided in the circuits of the rotor sufficient to produce a torque curve having the maximum torque occurring at zero speed or at a speed far below synchronous speed, for example a curve like B, or a curve like C, Fig. 5.

The resistance to produce such curves may be provided by chosen high resistance metal for the bars 27 and end rings 26 of the rotor 24, and by predetermining the cross sectional area of the conductor parts in the path of the current.

In the operation of the arrangement as thus far described, it may be assumed that the vehicle is at rest and that therefore the input shaft 5 is at rest, and that the engine is running at some selected speed capable of developing power efficiently, and that its output shaft 4 has a corresponding speed.

The switch 23 at this time may be open; and the shaft 4 drives the field poles 13—13 idly since the windings 16—16 are not energized.

When it is desired to start and accelerate the vehicle, the operator closes the switch 23.

The field windings 16—16 are thereby energized and the field poles 13—13 act somewhat like the field poles of a generator, and the flux therefrom generates current in the stator bars 10—10 which in turn produces the said rotating magnetic field through the rotor 24, and torque is developed in the rotor 24 as if it were the rotor of a squirrel case induction motor, and the torque is applied to the shaft 5 and to the vehicle rear axle.

The torque-speed characteristic curve of the rotor 24 is preferably that shown at C, Fig. 5, as explained, and the rotor 24 being at rest, the torque is that at the point 35 on curve C.

The mechanical power delivered by the engine is absorbed in driving the field poles 13—13 and is represented by both speed and torque and is transformed into electrical power in the unit 6; and is converted in the unit 6 to torque on the input shaft 5.

This axle driving torque will be very high, being the torque of the engine greatly multiplied, and the vehicle is started thereby.

In Fig. 5, for any chosen unit of measurement for plotting abscissae and ordinates, the point 32 corresponding to "synchronous" speed of the rotor 24, is not fixed (as it is in the case of a squirrel cage induction motor) but will move back and forth to different positions along the horizontal axis of Fig. 5, as the engine speed varies.

Accordingly if the said selected speed of the engine referred to for this description of operation were to be increased, the point 32 of Fig. 5 would move to the right, say to the position 36; representing a higher synchronous speed for the rotating field of the stator 7; and the torque curve C for the rotor would change and become as at D, and the torque applied to the driving axle would be correspondingly higher as at 37.

So that if for any reason the vehicle does not start at the selected engine speed for want of sufficient torque, it can be started by increasing the engine speed to increase the torque.

When the arrangement of Fig. 4 is utilized to energize the field windings 16—16, the current from the generator 30 may be adjusted to an intermediate value at the said selected speed of the engine. If the engine speed is increased as aforesaid to develop more starting torque on the driving axle, the generator 30 will be driven faster and energize the windings 16—16 more strongly and produce more flux, and the current in the stator bars 10—10 will be increased, and the rotating field of the stator 7 will be stronger and the increase of torque developed in the rotor 24 will be greater than that due to increase of engine speed alone.

When the vehicle has started and begins to gain speed, the driving torque applied by the shaft 5 decreases, that is, in Fig. 5, curve C, the speed approaches synchronous speed 32 and the torque ordinates decrease. The same would be true for other engine speeds, for example that producing curve D and having synchronous speed 36.

When the vehicle is running and for any given constant engine speed, the torque values applied to the driving axle will rise or fall in accordance with the slowing down or speeding up of the vehicle as the road conditions vary; and for increased engine speed these values will likewise vary but be higher, and vice versa for decreased engine speed.

Again, in the case of a squirrel cage induction motor, having a fixed synchronous rotor speed, if the rotor be driven by some external means above synchronous speed, its action changes to that of a generator. Current is generated in the stator winding that produces the rotary field and is pumped back therefrom into the alternating current means supplying exciting current to the stator. Torque is developed by the rotor opposing the outside force that is rotating it.

Figure 6:
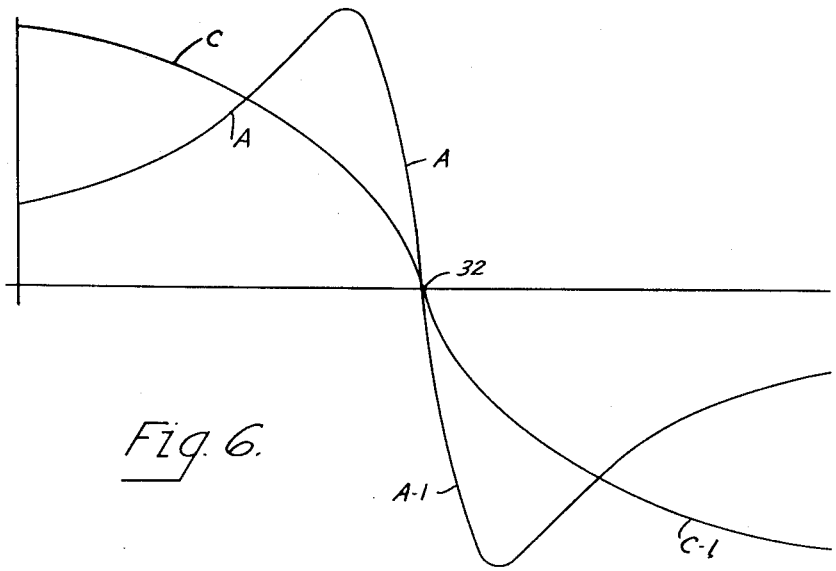
Fig. 6 is a diagram similar to Fig. 5 illustrating other operative characteristics of the embodiment of Fig. 1.

This is illustrated in Fig. 6. The motor torque curve A is reproduced from Fig. 5. At the point 32, at synchronous speed, the torque reverses in direction and has values in the curve A-1 substantially like those of curve A. The torque of curve A-1 therefore is dynamic braking torque for the motor and is so used in practice, with induction motors.

In accordance with the present invention, which utilizes this principle, the torque curve C of Fig. 5 is reproduced in Fig. 6, and passing through the zero torque point 32 becomes the curve C-1.

If the vehicle being driven should "overhaul" as upon going down a hill, the shaft 5 would drive the rotor 24 above its synchronous speed at the time, and it would act as a generator and generate load current in the conductors 10—9 of the stator 7, and this load would develop torque resisting rotation of the rotor and acting as a brake.

The faster the vehicle tries to go, the farther above synchronous speed will the rotor 24 be driven and the greater the braking torque becomes, as shown by curve C-1.

To reduce this dynamic braking action if desired, the engine speed could be increased to increase the synchronous speed so that the rotor 24 would be driven closer to synchronous speed; and, vice versa, to increase the braking action the engine speed could be reduced.

Similarly, if the vehicle is being driven by applied torque, say at high engine speed and power, if it becomes desirable to quickly slow down the vehicle, a quick reduction of engine speed will quickly reduce the synchronous speed of the rotor 24, and the said braking action will develop great braking torque on the vehicle and slow it down.

Fig. 1 illustrates the unit 6 diagrammatically, with the field poles 13—13 and the rotor 24 within a tubular stator 7.

Figure 7:
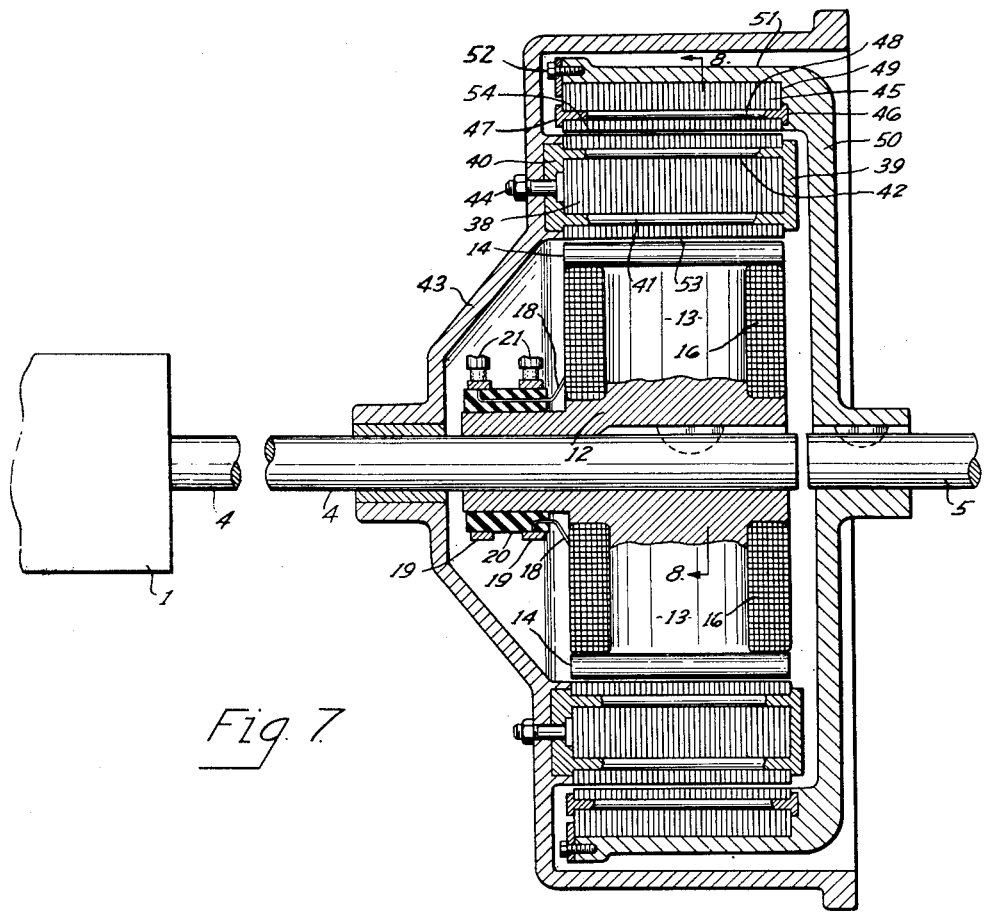
Fig. 7 is a longitudinal sectional view of a modification of the embodiment of Fig. 1.

To confine the unit to smaller space the same parts with the same end results may be arranged as in Fig. 7.

The engine 1 has the output shaft 4 driving the field poles 13 having the field windings 16 and pole pieces 14, the windings energized by direct current supplied to rings 19—19 on an insulation sleeve 20, by brushes 21—21, the rings connected to the windings by terminal wires 18—18, all as described for the first form.

An annular laminated tube-form stator 38 has end rings 39 and 40, connected by two concentric circular sets of conductor bars, an inner set of bars 41—41 and an outer set 42—42. The stator 38 is mounted upon a stationary frame element 43 by bolts 44 going through the end ring 40.

Radially outward of the stator 38 is the rotor, in this case 45, of annular tubular form, built up of laminations and having end rings 46—47 connected by conductors 48.

The rotor 45 is seated upon an annular shoulder 49 formed on a rotor frame 50 and surrounded by a skirt 51 of the frame, and the rotor is clamped upon the shoulder and thereby secured to the rotor frame, by devices at 52 on the skirt 51 overhanging the rotor. The rotor frame is mounted on and secured to the shaft 5.

The stator 38 is formed to have a cylindrical working gap 53 between it and the pole pieces 14; and the rotor 45 and stator 38 are formed to have a cylindrical work gap 54 therebetween.

In the operation of the form of Fig. 7, the flux from a positive field pole 13, passes across the gap 53 into the laminations of the stator 38 cutting the stator bars 41 and returns to a negative field pole 13 by way of the laminations; thus generating current in the inner stator bars 41.

This current flows as alternating current in closed loops each comprising a bar 41, end ring 39, a bar 42, and end ring 40.

This alternating current in the outer stator bars 42 produces a periodic magnetic field in the iron of the stator 38 across the gap 54 and in the iron of the rotor 45, and this field rotates around the annular stator and rotor in correspondence with rotation of the pole pieces 13—13.

This rotating magnetic field and the rotor conductors 48 react on each other in a manner similar to the reaction of the rotating field and rotor conductors of a squirrel cage induction motor as set forth in the description of the form of Fig. 1, and torque is accordingly developed in the rotor 45, transmitted to the rotor frame 50 and thence to the shaft 5.

Figure 8:
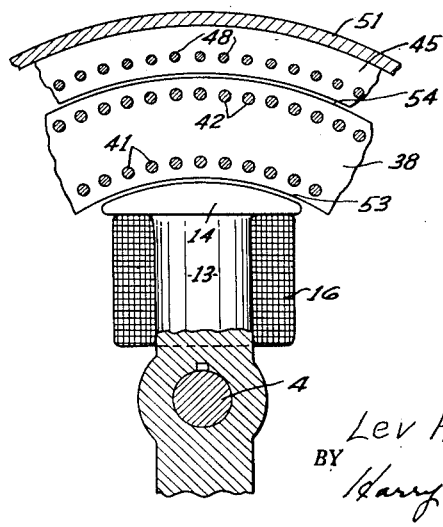
Fig. 8 is a fragmentary sectional view taken from the plane 8—8 of Fig. 7.

Otherwise the operation of the form of Figs. 7 and 8 inclusive is the same as that of Figs. 1 to 6 inclusive.

Figure 9:
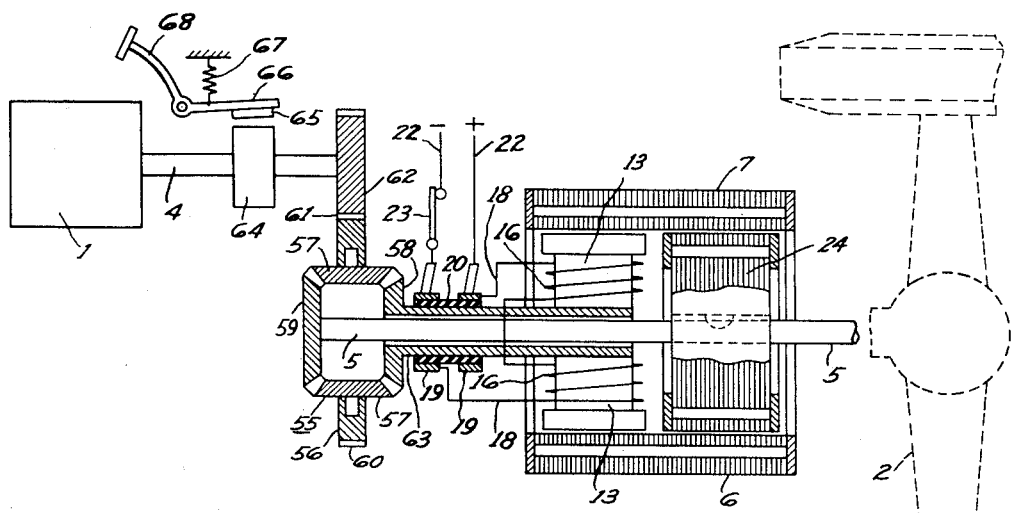
Fig. 9 is a view similar to Fig. 1, but illustrating another embodiment of the invention.

In Fig. 9 is illustrated another form of the invention in which a differential gearing is used in the line of transmission through the unit 6 with certain advantages to be described.

The unit 6, as shown, may be the same as that of Fig. 1, and by using the same reference characters as in Fig. 1, for some of the parts, a full description is deemed unnecessary.

At 55 generally is the differential gearing referred to. It comprises a spider 56, rotatably supporting pinions 57—57, and two differential gears 58 and 59 both meshed with the pinions.

The spider 56 has gear teeth 60 on its periphery meshed at 61 with teeth on a gear 62 on the output shaft 4 of the engine 1, whereby the rotatable spider is driven.

The differential gear 59 is connected directly to the input shaft 5 going to the vehicle driving axle in the axle housing 2. The rotor 24 is mounted on and secured to the shaft 5.

The field poles 13—13 are connected to the differential gear 58, by being mounted on and secured to a tubular shaft 63 surrounding the shaft 5 and connected to the differential gear 58.

The field windings 16—16 of the field poles are, as in Fig. 1, energized, while rotating, from a direct current source connected to wires 22—22.

With this arrangement when the vehicle is at rest, the shaft 5 and the differential gear 59 are at rest; and if the engine is running at a selected speed, the engine drives the spider 56 at engine speed (assuming a one-to-one ratio of gear 62 to spider 56) and the spider drives the differential gear 58 and field poles 13 at twice engine speed.

The torque from the engine 1, put into the spider 56 divides equally between the differential gears 59 and 58, and thus one-half of the engine torque goes directly by way of shaft 5 to the driving axle. The other half of the engine torque drives the field poles 13—13; and as described for Fig. 1, a rotating magnetic field is produced by the stator 7 the rotary synchronous speed of which is that of the field poles 13 and therefore, in this case, twice as fast as the engine speed.

The rotating field develops torque in the rotor 24 as described for Fig. 1, and this torque is applied to the shaft 5 and added to that coming directly from the engine.

The operation and advantages of the form of Fig. 9 may best be understood by a comparison with the form of Fig. 1.

As to Fig. 1, it was shown that a high standstill starting torque could be developed represented in Fig. 5 by the point 35 on curve C. This torque is all developed in the conversion unit 6; and the unit 6 would, of course, be made of a size and weight corresponding to quantitative factors entering into the design, including the selected desired torque value itself at the point 35.

In the form of Fig. 9, a part of the standstill starting torque, say the said selected torque value 35, goes directly from the engine to the shaft 5, by way of differential gear 59; and the conversion unit 6 does not have to develop that part of the torque and because of this the unit 6 can be reduced in size and weight by a first factor.

Also, the synchronous speed of the rotary stator field is twice that for Fig. 1, and because of this the unit 6 can be reduced in size and weight by a second factor.

Thus by the introduction of the differential gearing 55, the whole conversion unit 6 can be made much smaller in size and weight for the same standstill maximum starting torque.

With the form of Fig. 9, when the vehicle shaft 5 gains speed, the differential gear 59 connected to it gains speed, and the differential gear 58 slows down. The speed of the rotary field of the stator accordingly is thereby slowed down. At high speed of the shaft 5, the differential gear 59 has approximately the same speed as the differential gear 58 and the synchronous speed of the rotary stator field (which at vehicle standstill was twice that of the form of Fig. 1) becomes approximately the same as that of Fig. 1.

Thus in the form of Fig. 9, for any given engine speed, the synchronous speed of the stator rotary field increases with any increase of vehicle load tending to slow down the vehicle, (such for example as upon climbing a hill) and the total torque developed on the shaft 5 therefor increases with a more sensitive response to such increase of load, than the form of Fig. 1, in which the synchronous speed is fixed by the engine speed.

Thus as the vehicle is proceeding along a road of variable grade, and for a constant engine speed, the driving torque rises or falls more rapidly and sensitively than for Fig. 1, as the road grade rises or declines.

The dynamic braking action described for Fig. 1 also occurs with the form of Fig. 9 and may be utilized even more effectively and sensitively than that of Fig. 1.

When the vehicle comes to the top of a hill, and begins to descend, the driver will naturally reduce the power supplied by the engine and it will slow down, and slow down the spider element 56.

The gear 59 is then driven by the vehicle from the rear axle 5 and its speed will correspond to that of the vehicle and tend to increase as the vehicle tends to gain speed and overhaul going down the hill.

Decreasing the speed of the spider element 56 and maintaining or even increasing the speed of the gear 59 causes the gear 58 to slow down, thus decreasing the speed of the rotary magnetic field at the rotor 24. The speed of the rotor 24 is, however, maintained or even increased, being connected to the gear 59. The rotor 24 is thus driven above synchronous speed by an amount due both to speeding up of the rotor and slowing down of the rotary field, and great dynamic braking torque is sensitively developed on the rotor 24 by the action described for Fig. 1.

At this time, the reaction of the gears 59 and 58 on the spider element 56 through the pinions 57—57 is in the direction to tend to speed up the spider element, and to tend to drive the engine above the speed corresponding to the fuel supplied to it. As is well known, in practice with the conventional speed change gear transmission, the engine will resist being mechanically speeded up and with such conventional transmissions its resistance is used for braking purposes.

Here its resistance to being speeded up opposes speeding up of the spider element and causes the aforesaid dynamic braking action to develop as described.

The maximum possible dynamic braking would occur if the engine were positively held at some minimum speed, or even stopped and held at zero speed; because then the gear 59 driven by the vehicle, reacting through the pinions 47—47, would reverse the direction of the gear 58 and reverse the direction of the rotary field for the rotor 24. Dynamic braking at the rotor 24 would then be developed not merely by a difference in speed of the rotor and the rotary field both in the same direction, but by a much greater difference of speed due to their opposite directions of rotation, and the dynamic braking action would be enormously increased.

To make certain of a low or zero engine speed for this maximum possible dynamic braking, a mechanical foot brake may be provided to slow down or stop the engine. Such a brake is indicated in Fig. 9, comprising a brake drum 64 on the engine shaft 4, and a brake shoe 65 on a pivoted arm 66 normally held out of contact with the drum by a spring 67 and moved into braking contact with the drum 64 by a pedal 68.

The full advantages of the invention are best developed when it is used with loads driven from a power source that operates at controlled variable speed, and for this reason has been fully described for that use. However, some of its most important operative features will be developed when the source of power always operates at the same speed, an example of which would be a load driven from a substantially constant speed electric motor connected to the shaft 4. In the foregoing description, the features of operation are described for the power source when running at selected speeds so that the operation of the invention for a constant speed power source will be understood without further description.

From the foregoing, it will be seen that the invention in one aspect is an improved transmission of the torque-converter class adapted for use with a power source and a load to be driven; and in another aspect it is an improved power plant as a whole, with particular advantages as the power plant of an automotive vehicle.

In the diagrammatic apparatus figures of the drawing, bearings for rotary parts have been omitted for simplification, and those skilled in the art will know how to apply such bearings.

It will be observed that the form of transmission of Fig. 1 between the shafts 4 and 5, is adapted to include differential gearing between the shafts 4 and 5 by the showing in Fig. 9; and that the transmission of Fig. 7 between the shafts 4 and 5 is like the transmission of Fig. 1 except for the arrangement and disposition of the rotor and stator; and it will be apparent that the transmission of Fig. 7 may be adapted to include differential gearing between the shafts 4 and 5 in the same manner as in Fig. 9; and that therefore this application discloses the use of the form of Fig. 7 with differential gearing.

I claim:

1. A transmission for supplying power from the rotary output shaft of a rotary power source at variable speed, to the rotary input shaft of a variable speed load; the transmission comprising a laminated rotor body of annular form mounted on the input shaft to apply driving torque thereto, rotor conductors therein spaced around and extending axially of the shaft and electrically connected to end rings on the body, to provide closed current paths; a laminated stator body of annular form having stator conductors therein spaced around and extending axially of the input shaft and connected to end rings on the body to provide closed current paths; the rotor body disposed radially outwardly of the stator body and the two bodies having, respectively, coaxial cylindrical surfaces separated by an annular air gap; a plurality of rotatable field poles of alternate polarity and energizing windings therefor, and circuit connections for energizing them with direct current during rotation of the field poles; the field poles disposed within the annular stator body, and having radially outer end portions defining a cylindrical surface spaced from a cylindrical surface on the annular stator body by an annular coaxial second air gap; a differential gearing comprising a spider element rotatably supporting pinions and two differential gears both meshed with the pinions; the spider element connected to receive driving torque from the engine output shaft; one differential gear connected to the field poles to apply driving torque thereto; the other differential gear connected to the input shaft; to apply driving torque thereto, the field poles upon rotation thereof generating current in the stator conductors which produces a rotating field in the stator body and across the first named air gap and in the rotor body; the field rotating at a speed commensurable with the speed of the output shaft; the rotating field in the rotor body and the rotor conductors reacting to develop torque on the rotor body and input shaft commensurable with the speed of the output shaft and inversely commensurable with the speed of the rotor and input shaft as determined by the speed of the load.

2. A power plant for automotive vehicles comprising an internal combustion engine having a rotary power output shaft whose speed is variable by the engine operator; a power input shaft to the vehicle driving axle; a transmission between the shafts comprising; a laminated rotor body of annular form mounted on the input shaft to apply driving torque thereto, rotor conductors therein spaced around and extending axially of the shaft and electrically connected to end rings on the body, to provide closed current paths; a laminated stator body of annular form having stator conductors therein spaced around and extending axially of the input shaft and connected to end rings on the body to provide closed current paths; the rotor body disposed radially outwardly of the stator body and the two bodies having, respectively, coaxial cylindrical surfaces separated by an annular air gap; a plurality of rotatable field poles of alternate polarity and energizing windings therefor, and circuit connections for energizing them with direct current during rotation of the field poles; the field poles disposed within the annular stator body, and having radially outer end portions defining a cylindrical surface spaced from a cylindrical surface on the annular stator body by an annular coaxial second air gap; a differential gearing comprising a spider element rotatably supporting pinions and two differential gears both meshed with the pinions; the spider element connected to receive driving torque from the engine output shaft; one differential gear connected to the field poles to apply driving torque thereto; the other differential gear connected to the input shaft, to apply driving torque thereto; the field poles upon rotation thereof generating current in the stator conductors which produces a rotating field in the stator body and across the first named air gap and in the rotor body; the field rotating at a speed commensurable with the speed of the engine; the rotating field in the rotor body and the rotor conductors reacting to develop torque on the rotor body and input shaft commensurable with the speed of the engine and inversely commensurable with the speed of the rotor and input shaft as determined by the speed of the vehicle driving axle.

References Cited in the file of this patent

UNITED STATES PATENTS

| | | |
|---|---|---|
| 1,158,243 | Lakey | Oct. 26, 1915 |
| 1,780,150 | Ahlm | Nov. 4, 1930 |
| 1,848,091 | Winther | Mar. 1, 1932 |
| 2,065,073 | Jacklitch | Dec. 22, 1936 |
| 2,441,605 | Trofimov | May 18, 1948 |